US011669922B2

(12) United States Patent
Ahmad et al.

(10) Patent No.: US 11,669,922 B2
(45) Date of Patent: Jun. 6, 2023

(54) CONNECTING A TUTOR WITH A STUDENT

(71) Applicant: FILO EDTECH INC., Lewes, DE (US)

(72) Inventors: Imbesat Ahmad, Patna (IN); Shadman Anwer, Delhi (IN); Rohit Kumar, Hisar (IN)

(73) Assignee: FILO EDTECH INC., Lewes, DE (US)

( * ) Notice: Subject to any disclaimer, the term of this patent is extended or adjusted under 35 U.S.C. 154(b) by 0 days.

(21) Appl. No.: 17/738,755

(22) Filed: May 6, 2022

(65) Prior Publication Data
US 2022/0261938 A1 Aug. 18, 2022

(30) Foreign Application Priority Data
Feb. 4, 2022 (IN) .............................. 202221006191

(51) Int. Cl.
*G06Q 50/20* (2012.01)
*G06Q 10/0631* (2023.01)

(52) U.S. Cl.
CPC ... *G06Q 50/205* (2013.01); *G06Q 10/063112* (2013.01)

(58) Field of Classification Search
None
See application file for complete search history.

(56) References Cited

U.S. PATENT DOCUMENTS

| | | | | |
|---|---|---|---|---|
| 6,160,987 A | * | 12/2000 | Ho ............................ | G09B 7/04 434/323 |
| 10,467,918 B1 | * | 11/2019 | Fieldman .................. | G09B 5/10 |
| 2002/0192631 A1 | * | 12/2002 | Weir ......................... | G09B 7/00 434/350 |
| 2004/0009461 A1 | * | 1/2004 | Snyder ...................... | G09B 7/02 434/350 |
| 2006/0031087 A1 | * | 2/2006 | Fox .......................... | G09B 7/00 705/326 |
| 2014/0024009 A1 | * | 1/2014 | Nealon ..................... | G09B 5/12 434/362 |
| 2014/0057242 A1 | * | 2/2014 | Sherman ................... | G09B 7/00 434/353 |
| 2014/0201126 A1 | * | 7/2014 | Zadeh ................... | A61B 5/7221 706/52 |
| 2014/0272908 A1 | * | 9/2014 | Black ........................ | G09B 5/08 434/362 |

(Continued)

*Primary Examiner* — Folashade Anderson
(74) *Attorney, Agent, or Firm* — Shumaker, Loop & Kendrick, LLP (57) ABSTRACT

A system and a method for connecting a tutor with a student in real time. Initially, the system receives a student profile. Further, the system receives a question from the student. Furthermore, the system synthesizes the question based on a set of predefined machine learning model. Subsequently, the system determines a cohort of the students from the set of the cohort of the students. The cohort of the students is determined based on the one or more parameters related to the question. Further, the system identifies a tutor assigned to the cohort of the students. Subsequently, the system notifies the tutor in real time. Further, the system receives an acknowledgement from the tutor within a predefined time. Finally, the system connects the tutor with the student in real time when the acknowledgement is the positive acknowledgement.

9 Claims, 5 Drawing Sheets

(56) References Cited

U.S. PATENT DOCUMENTS

| | | | |
|---|---|---|---|
| 2014/0280087 A1* | 9/2014 | Isensee | G06F 16/3329 707/723 |
| 2015/0279225 A1* | 10/2015 | Barber | G09B 7/02 434/322 |
| 2016/0042654 A1* | 2/2016 | Fieldman | G09B 5/06 434/362 |
| 2016/0063655 A1* | 3/2016 | Piconi | G06Q 50/20 705/326 |
| 2022/0180319 A1* | 6/2022 | Saxena | G16H 10/20 |

* cited by examiner

CONNECTING A TUTOR WITH A STUDENT

PRIORITY INFORMATION

The present application claims priority from Indian patent application no 202221006191 filed on 4 Feb. 2022.

TECHNICAL FIELD

The present subject matter described herein, in general, relates to connect a tutor with a student in real time.

BACKGROUND

The Covid-19 has made an enormous impact on the education system. The schools and the colleges are completely shut, and teachers are giving online lectures. Due to this, the online education domain has seen significant growth. With the advent of technology, a student logs in to an education platform and learn whatever he aspires to from any part of the world. Today, there are tons of education platforms available for helping students learn. There are thousands of courses already designed for a particular topic. The student only has to use his mobile or laptop and start learning online.

It is important to note that the education platform available today either offers a pre-recorded course for a topic or live lectures related to a topic. Further, it is difficult for the student to determine the best suitable teacher and the course from the pool of different courses and available teachers. Existing education platforms provide course ratings and tutor ratings to help the students to choose the right course and the teacher. However, the effectiveness of the online education is still under question.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application. This summary is provided to introduce aspects related to a system and a method for connecting a tutor with a student in real time. This summary is not intended to identify essential features of the claimed subject matter nor is it intended for use in determining or limiting the scope of the claimed subject matter.

In one implementation, a method for connecting a tutor with a student in real time is disclosed. Initially, a student profile may be received. The student profile may comprise demographic information, a set of a cohort of a student, academic details, a performance score, a preferred language of learning, a preferred mode of communication, a feedback from previous tutors, a favourite tutor, aspirations of the student, an available time slot, and a study pattern. It may be noted that the cohort of the students may indicate a plurality of students with similar profiles. Further, a question may be received from the student. The question may be received in at least an image form, a text form, and a voice form. The question may be synthesized based on a set of predefined machine learning model. The question may be synthesized into one or more parameters comprising a subject, a topic, a sub-topic, a concept, a category, a language of the question, and a difficulty level. Subsequently, a cohort of the students from the set of the cohort of the students may be determined. The cohort of the students may be determined based on the one or more parameters related to the question. Further, a tutor may be dynamically assigned to the cohort of the students. The tutor may be identified for answering the question. It may be noted that the tutor may be identified based on a relevancy score between a student profile and a tutor profile. The tutor may be identified when the relevancy score is greater than a predefined threshold. The relevancy score may be computed using Artificial Intelligence Techniques and Deep Learning Algorithms.

Further, the tutor may be notified on the platform in real time. The tutor may be notified based on the relevancy score. Subsequently, an acknowledgement may be received from the tutor within a predefined time. The acknowledgement may be one of a positive acknowledgement or a negative acknowledgement. The tutor may be connected with the student in real time when the acknowledgement is the positive acknowledgement. In one aspect, the aforementioned method for connecting a tutor with a student in real time may be performed by a processor using programmed instructions stored in a memory.

In another implementation, a non-transitory computer readable medium embodying a program executable in a computing device for connecting a tutor with a student in real time is disclosed. The program may comprise a program code for receiving a student profile comprising demographic information, a set of a cohort of a student, academic details, a performance score, a preferred language of learning, a preferred mode of communication, a feedback from previous tutors, a favourite tutor, aspirations of the student, an available time slot, and a study pattern. The cohort of the students may indicate a plurality of students with similar profiles. Further, the program may comprise a program code for receiving a question from the student. The question may be received in at least an image form, a text form, and a voice form. Subsequently, the program may comprise a program code for synthesizing the question based on a set of predefined machine learning model. The question may be synthesized into one or more parameters comprising a subject, a topic, a sub-topic, a concept, a category, a language of the question, and a difficulty level. Further, the program may comprise a program code for determining a cohort of the students from the set of the cohort of the students. The cohort of the students may be determined based on the one or more parameters related to the question. Subsequently, the program may comprise a program code for dynamically identifying a tutor assigned to the cohort of the students. The tutor may be identified for answering the question. The tutor may be identified based on a relevancy score between a student profile and a tutor profile. The tutor may be identified when the relevancy score is greater than a predefined threshold. The relevancy score may be computed using Artificial Intelligence Techniques and Deep Learning Algorithms.

Further, the program may comprise a program code for notifying the tutor on the platform in real time. The tutor may be notified based on the relevancy score. Furthermore, the program may comprise a program code for receiving an acknowledgement from the tutor within a predefined time. It may be noted that the acknowledgement may be one of a positive acknowledgement or a negative acknowledgement. Finally, the program may comprise a program code for connecting the tutor with the student in real time when the acknowledgement is the positive acknowledgement.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for connecting a tutor with a student in real time disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "synthesizing," "identifying," "determining," "notifying," "connecting," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

The present subject matter discloses a method and a system for connecting a tutor with a student in real time. Initially, the system may receive a question from a student. It may be noted that the student may submit the question on an education platform (hereinafter platform). The question may be received in at least an image form, a text form, and a voice form. Further, the system may synthesize the question based on at least one or more parameters. It may be noted that the system synthesizes the question in order to determine the one or more parameters such as a subject, a topic, a sub-topic, a concept, a category, a language of the question, and a difficulty level. Further, the system may determine a cohort of the students from a set of cohort of the students. It may be noted that the student may belong to the set of the cohort of the students. Further, the system may dynamically identify the one or more tutors assigned to the cohort of the students. It may be noted that the goal of the invention is to connect the student with the tutor who is apt for teaching the student. After identifying the tutor, the system may connect the tutor with the student when the system receives a positive acknowledgement from the tutor. It may be noted that tutor A may be a good tutor for student A but not for student B present in the same cohort as the student A. The invention aims to identify an appropriate tutor for the question asked by the student.

In an embodiment, the student may use the education platform to submit the question. Further, the tutor may receive a notification about the question on the education platform. When the tutor positively acknowledges the question, the system may connect the tutor and the student on the platform. It may be noted that the student and the tutor may connect over a video call or an audio call based upon a preferred mode of communication submitted by the student and the tutor.

Certain technical challenges exist for achieving the goal of connecting a tutor with a student. One technical challenge includes accurately synthesizing the question into one or more parameters comprising a subject, a topic, a sub-topic, a category, a language of the question, and a difficulty level. The solutions presented by the embodiments disclosed herein to address the above challenge are machine-learning models for Natural Language Processing (NLP) Techniques. It may be noted that the use of one or more machine learning models is required to extract one or more parameters. The one or more machine learning models may comprise a Term Frequency-Inverse Document Frequency (TF-IDF), a support vector machine; a regression model; or a convolutional neural network. Another technical challenge includes accurately determining a cohort of the students from the set of the cohort of the students. The solution presented by the embodiments disclosed herein to address this challenge is the one or more parameters related to the question asked by the student, which is helping the system to determine the cohort of the students from the set of the cohort of the students. In an embodiment, the system may analyse the student profile using machine learning models to determine the cohort of the students. Another technical challenge includes dynamically identifying a tutor assigned to the cohort of the students. It must be noted that the conventional systems randomly identify the tutor for the student and the tutor may not be a good tutor for the student. The solution presented by the embodiments disclosed herein to address this challenge is calculating a relevancy score between a student profile and a tutor profile using Artificial Intelligence Techniques and Deep Learning Algorithms. Certain embodiments disclosed herein may provide one or more technical advantages. A technical advantage of the embodiments may include efficiently adapting to various client systems and software with the ability to connect the tutor and the student. Another technical advantage of the embodiments may include improved understanding of the question as to the voice form, text form, and image. Certain embodiments disclosed herein may provide none, some, or all of the above technical advantages. One or more other technical advantages may be readily apparent to one skilled in the art in view of the figures, descriptions, and claims of the present disclosure.

Figure 1:
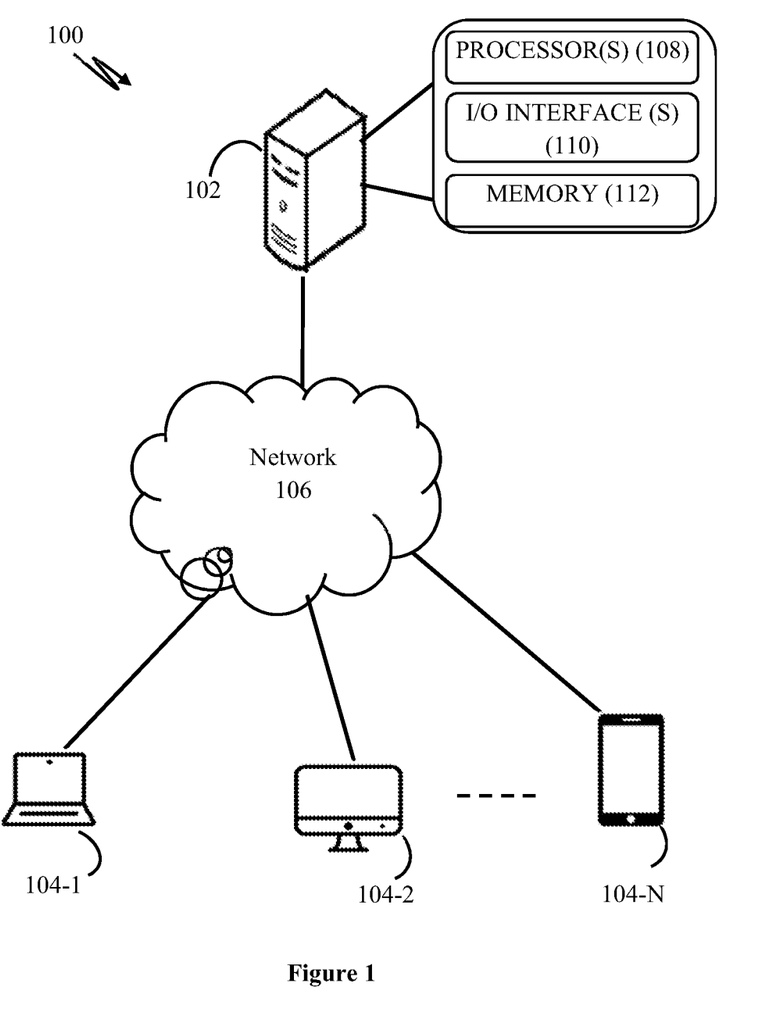
FIG. 1 illustrates a network implementation for connecting a tutor with a student in real time, in accordance with an embodiment of the present subject matter.

Referring now to FIG. 1, a network implementation 100 of a system 102 for connecting a tutor with a student in real time is disclosed. Initially, the system 102 receives a student profile. In an example, the software may be installed on a user device 104-1. It may be noted that the one or more users may access the system 102 through one or more user devices 104-2, 104-3 . . . 104-N, collectively referred to as user devices 104, hereinafter, or applications residing on the user devices 104. The system 102 receives the student profile from one or more user devices 104. Further, the system may also 102 receive a feedback from a user using the user devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more user devices 104-1, 104-2 . . . 104-N. In one implementation, the system 102 may comprise the cloud-based computing environment in which the user may operate individual computing systems configured to execute remotely located applications. Examples of the user devices 104 may include, but are not limited to, a portable computer, a personal digital assistant, a handheld device, and a workstation. The user devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for connecting a tutor with a student in real time. At first, a user may use the user device 104 to access the system 102 via the I/O interface 110. The user may register the user devices 104 using the I/O interface 110 in order to use the system 102. In one aspect, the user may access the I/O interface 110 of the system 102. The detail functioning of the system 102 is described below with the help of figures.

The present subject matter describes the system 102 for connecting a tutor with a student in real time. Initially, the system 102 receives a student profile. The student profile may comprise demographic information, a set of a cohort of a student, academic details, a performance score, a preferred language of learning, a preferred mode of communication, a feedback from previous tutors, a favourite tutor, aspirations of the student, an available time slot, and a study pattern. It may be noted that the cohort of the students indicates a plurality of students with similar profiles. In an embodiment, the student profile is stored in the memory 112. The demographic information of the student may comprise name, age, gender, and location of the student. The performance score may comprise previous marks scored by the student and a rating given by one or more tutors to the student. The mode of communication comprises at least one of a video based, an audio based, and a text based.

It may be noted that the student may belong in one or more cohorts of the students (a set of cohorts of the students). In an example, let us assume that the performance of the student in Physics and Mathematics is good. Further, the performance of the student in chemistry is weak. The system 102 may assign student to the cohort of the students having good Physics and Mathematics. Further, the student may belong in another cohort of the students having weak Chemistry.

In an embodiment, the system 102 may receive the aspirations of the student. In an example, the aspirations of the student may be number of marks in a subject the student wants to achieve in an exam. In other example, the aspirations of the student may be number of topics the student wants to learn in a certain duration. It is to be noted that the aspirations may be prestored in the system 102.

In an embodiment, the student profile may comprise a list of favourite tutors of the student. Consider an example, the student may mark tutor A and tutor B as favourite for one topic (e.g. Electrostatics). In the example, the student may mark tutor A as a favourite tutor for learning concepts related to Electrostatics. Further, tutor B may be marked as a favourite tutor for solving analytical or numerical questions.

In an embodiment, the study pattern of the student profile may comprise time of study of the student (e.g. morning, evening, night), number of study hours of the student in a day, number of study hours of the student in one sitting, and books referred by the student. In an embodiment, the student may use one or more books for studying a subject. In an embodiment, the student may refer book A for learning concepts related to a subject. Further, the student may refer book B for numerical questions related to the subject.

In one embodiment, the system 102 may receive the student profile in a structured data format. It is to be noted that the system 102 may perform data computations on the structured data format. In one aspect, the system 102 may receive the student profile in an unstructured data format. Subsequently, the system 102 may perform data cleaning on the unstructured data format to obtain the structured data format. It must be noted that the system 102 may utilize predefined data cleaning algorithms to clean the unstructured data.

Further to receiving the student profile, the system 102 may receive a question from the student. It may be noted that the question may be received in at least an image form, a text form, and a voice form. In an example, the student may click a picture of the question from a textbook. Furthermore, the student may upload the question on a platform. It may be noted that an image recognition technique may be used to convert the question in the image form to the text form. In an embodiment, the system 102 may use an Optical Character Recognition (OCR) for converting the question in the image form to the text form. Likewise, a speech to text conversion technique may be used by the system 102 to convert the voice based question into text.

Further to receiving the question, the system 102 may synthesize the question based on a set of predefined machine learning model. The question may be synthesized into one or more parameters comprising a subject, a topic, a sub-topic, a concept, a category, a language of the question, and a difficulty level. The category may comprise numerical, conceptual, and analytical. Furthermore, the difficulty level of the question may be calculated based on a percentage of time the question being unanswered by a tutor, a frequency of the question being asked, average time take by tutors to solve the question, and the profile of the cohort of the students. It is to be noted that the difficulty level of the question is updated in real time based on the number of instances the same question is asked on the platform.

Consider an example, the system 102 receives a question from a student. Further, the system synthesizes the question into one or more parameters. Let us assume that the system determines that the subject of the question is Physics. Further, the system determines that the topic is Electro Magnetic Induction, and the sub-topic is Mutual Induction. Furthermore, the system may determine that the question may be a numerical question. It may be noted that the category of the question is determined by using Machine Learning Algorithms. Further, the system determines the difficulty level of the question. In the example, the system may check the percentage of time the question or similar questions being unanswered by a tutor, the frequency of the question being asked, the average time taken by tutors to solve the question or the similar questions, and the profile of the cohort of the students.

In an embodiment, let us assume a cohort of the students having performance score above a predefined threshold. The system may mark questions from said cohort of the students as difficult question.

Further to synthesizing the question, the system 102 may determine a cohort of the students from the set of the cohort of the students. The cohort of the students may be determined based on the one or more parameters related to the question. Consider an example, the system 102 receives the question from the student. The system 102 determines the one or more parameters related to the question. Let us assume that the subject, the topic, and the sub-topic of the question are Mathematics, Integration and Triple Integration respectively. Let us assume that the student's Integration topic is weak based upon the performance score of the student and the set of cohorts of the students. In the example, the system 102 may determine the cohort of the students having weak Integration topic.

Further to determining, the system 102 may dynamically identify a tutor assigned to the cohort of the students. The tutor may be identified for answering the question. The tutor may be identified based on a relevancy score between a student profile and a tutor profile. The tutor profile may comprise a tutor rating, the topic, the sub-topic, the preferred language, a preferred mode of the answer, a preferred category of the answer, and a type of questions answered. The tutor may be identified when the relevancy score is greater than a predefined threshold. The relevancy score may be computed using Artificial Intelligence Techniques and Deep Learning Algorithms.

In an embodiment, one or more tutors may be assigned to the cohort of the students. In the above example, the one or more tutors may be assigned to the cohort of the students having weak integration. Further, the one or more tutors are identified based on the relevancy score between the student profile and the tutor profile. In the example, let us assume that the preferred language of learning of the cohort of the student is English and the preferred mode of communication is Video. The system 102 may identify the tutor having the preferred language of teaching as English and the preferred mode of communication as Video. It may be noted that the tutor may be identified only when the relevancy score is greater than a predefined threshold of the cohort of the student.

Further, the system 102 may notify the tutor in real time. The tutor may be notified based on the relevancy score. In an embodiment, the tutor may be notified on the tutor's device—a mobile, a tablet, or a computer. In an embodiment, the tutor may be notified with a question asked by a student. In another embodiment, the tutor's device may display the question asked by the student.

Further to notifying, the system 102 may receive an acknowledgement from the tutor within a predefined time. The acknowledgement is one of a positive acknowledgement or a negative acknowledgement. In an embodiment, the tutor may be allotted a predefined time to acknowledge the question. In another embodiment, the tutor's device may display the question, an option for a tutor to accept or reject the question and a time limit to acknowledge the question.

Further to notifying, the system 102 may connect the tutor with the student in real time when the acknowledgement is the positive acknowledgement. It may be noted that the system 102 connects the tutor and the student on the basis of the preferred mode of communication. Consider an example, the preferred mode of the communication of the tutor and the student is Video. The system 102 may connect the tutor and the student over a video call.

Consider an example, the system receives a question from a student. The system identifies the one or more tutors having the relevancy score higher than the predefined threshold. The system notifies the one or more tutors with the question. The system connects the student with the tutor who positively acknowledged the question earlier than other tutors. In an embodiment, the other tutors may receive a pop up that the question has already acknowledged.

Consider another example, the system receives a question from a student. The system identifies a tutor having a highest relevancy score amongst the other tutors. The system notifies the tutor with the question. When the system receives a positive acknowledgement from the tutor the system connects the tutor and the student. In an embodiment, when the system receives the negative acknowledgement, the system may identify some other tutor having a second highest relevancy score.

Consider an example, the system receives a student profile. Below table shows the student profile:

| | |
|---|---|
| Academic Details | 12$^{th}$ Standard, CBSE |
| Performance Score | Physics- 9.5 |
| | Mathematics- 9.5 |
| | Chemistry- 7 |
| Preferred Language | English, Hindi |
| Preferred mode of Communication | Video |
| Preferred Time Slots | 5 am to 7 am; 6 pm to 9 pm |

Let us assume that the system receives a question from the student. The question may be "E1(r), E2(r) and E3(r) be the respective electric fields at a distance r from a point charge Q, an infinitely long wire with constant linear charge density, and an infinite plane with uniform surface charge density o. If E1 $(r_o)$=E2 $(r_o)$=E3 $(r_o)$ at a given distance to, then"

Further, the system 102 synthesizes the question in the one or more parameters based on a set of predefined machine learning model. The one or more parameters may be a subject—Physics, a topic—Electrostatics, a category—Numerical, a language of the question—English, and a difficulty level—Hard. Further, the system determines a cohort of the students from the set of the cohort of the students. The cohort of the students may be determined based on the one or more parameters related to the question. Further, the system may identify one or more tutor assigned to the cohort of the students based on the relevancy score. It may be noted that the one or more tutors are identified based on the relevancy score between the student profile and the tutor profile. Let us assume that the assigned tutors to the cohort of the students are tutor A, tutor B, tutor C, and tutor D. The tutor profiles of the one or more tutors may be:

| Tutor | Rating | Subject | Topic | Language | Category |
|---|---|---|---|---|---|
| A | 8.5 | Physics | Electrostatics | English | Numerical |
| B | 9 | Physics | Electrostatics | English and Hindi | Conceptual |
| C | 9.5 | Physics | Electrostatics | English and Hindi | Numerical |
| D | 9.9 | Physics | Electrostatics | English | Conceptual |

In the above example, the relevancy score of the tutor C is the highest when compared to tutor A, tutor B, and tutor D. Further, the system may notify the tutor C in real time. The tutor C and the student may connect with each other when the system receives a positive acknowledgement from the tutor C.

In the above example, even though the rating of the tutor D is 9.9. The tutor D was not appropriate tutor for the student because the relevancy score of the tutor D is less when compared to tutor C. It may be noted that the question asked by the student was a numerical question. Further, the tutor D is good with conceptual questions whereas the tutor C is good with the numerical questions. The system computes the relevancy score using Artificial Intelligence Techniques and Deep Learning Algorithms.

Consider another example, the system 102 receives a negative acknowledgment from tutor A. Further, the system may identify tutor B based on the relevancy score between the student profile and the tutor profile. It may be noted that the relevancy score of the tutor B may be less than the tutor A. Further, the system may notify the tutor B to answer the question received from the student. Let us assume that the system receives a negative acknowledgement from the tutor B. Further, the system 102 may identify tutor C based on the relevance score. It may be noted that the system 102 may continuously identify the tutor for the student until the system receives a positive feedback from the tutor. In another embodiment, when the system 102 receives one or more negative acknowledgements the system may mark the question as a difficult question.

It may be noted that the present invention is unique in a way because the invention aims to connect the student and the tutor. Further, the invention uses Artificial Intelligence Techniques and Deep Learning Algorithms to identify the tutor based on the relevancy score between the student profile and the tutor profile.

It may be noted that the system 102 is continuously receiving the data related to the student and the tutor. Further, the data is being used to match students to the tutors that are relevant for the students. The system 102 evolves over a period of time and with the deep understanding of the data the student and the tutor matching become more efficient.

It may be noted that as the student engages more with the platform direct and interpreted parameters of the student profile start to mature. Thus, increasing the relevancy of the matching system. Further, the student is connecting with the tutors on the platform every day. Thus, the system 102 receives the data related to the student on the daily basis. The system 102 may receive feedback from the students on the tutors that are relevant for the students and the ones that are not. The system may store the student feedback and further tune the type of tutors that student finds relevant. In an embodiment, the system 102 will get deep with the engagement of the tutors identifying the most favoured triangle—the tutor, the question and the student.

Education platforms available today in the market fail to connect the student and the tutor based on the relevancy score of the student profile and the tutor profile. Hence, the student, in most of the scenarios, may not find teaching style of the tutor as effective. Thus, the student ends up spending more than required time for learning a topic. The present invention overcomes the disadvantage of the traditional education platforms and helps to connect the student with the tutor which are relevant for them.

Figure 2:
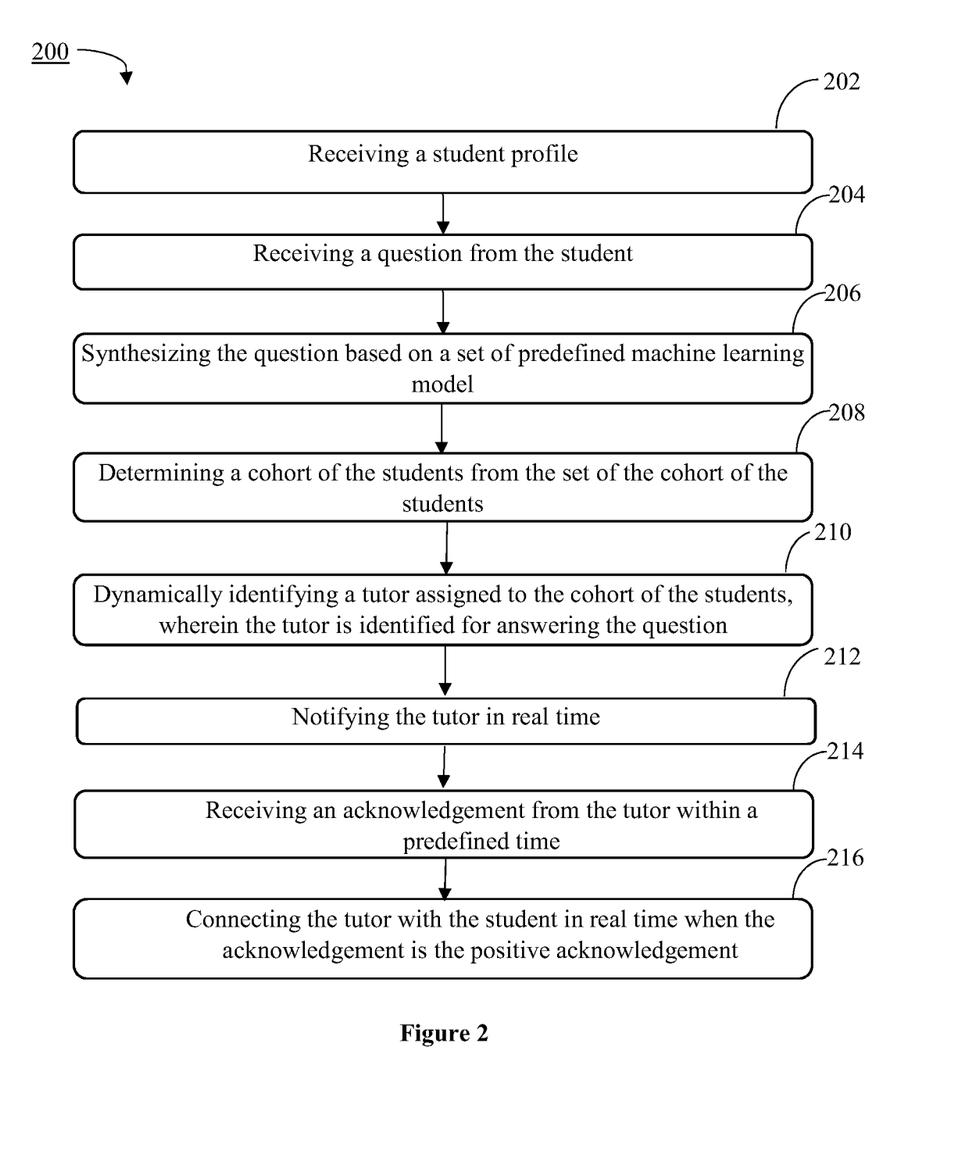
FIG. 2 illustrates a method for connecting a tutor with a student in real time, in accordance with an embodiment of the present subject matter.

Referring now to FIG. 2, a method 200 for connecting a tutor with a student in real time is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for connecting a tutor with a student in real time. Additionally, individual blocks may be deleted from the method 200 without departing from the scope of the subject matter described herein. Furthermore, the method 200 for connecting a tutor with a student in real time can be implemented in any suitable hardware, software, firmware, or combination thereof. However, for ease of explanation, in the embodiments described below, the method 200 may be considered to be implemented in the above-described system 102.

At block 202, a student profile may be received. The student profile may comprise demographic information, a set of a cohort of a student, academic details, a performance score, a preferred language of teaching, a preferred mode of communication, a feedback from previous tutors, a favourite tutor, aspirations of the student, an available time slot, and a study pattern.

At block 204, a question may be received from the student. The question may be received in at least an image form, a text form, and a voice form.

At block 206, the question may be synthesized based on a set of predefined machine learning model. The question may be synthesized into one or more parameters comprising a topic, a sub-topic, a concept, a category, a language of the question, and a difficulty level.

At block 208, a cohort of the students from the set of the cohort of the students may be determined. The cohort of the students may be determined based on the one or more parameters related to the question.

At block 210, a tutor may be dynamically assigned to the cohort of the students. The tutor may be identified for answering the question. It may be noted that the tutor may be identified based on a relevancy score between a student profile and a tutor profile. The tutor may be identified when the relevancy score is greater than a predefined threshold. The relevancy score may be computed using Artificial Intelligence Techniques and Deep Learning Algorithms.

At block 212, the tutor may be notified on the platform in real time. The tutor may be notified based on the relevancy score.

At block 214, an acknowledgement may be received from the tutor within a predefined time. The acknowledgement may be one of a positive acknowledgement or a negative acknowledgement.

At block 216, The tutor may be connected with the student in real time when the acknowledgement is the positive acknowledgement.

Figure 3:
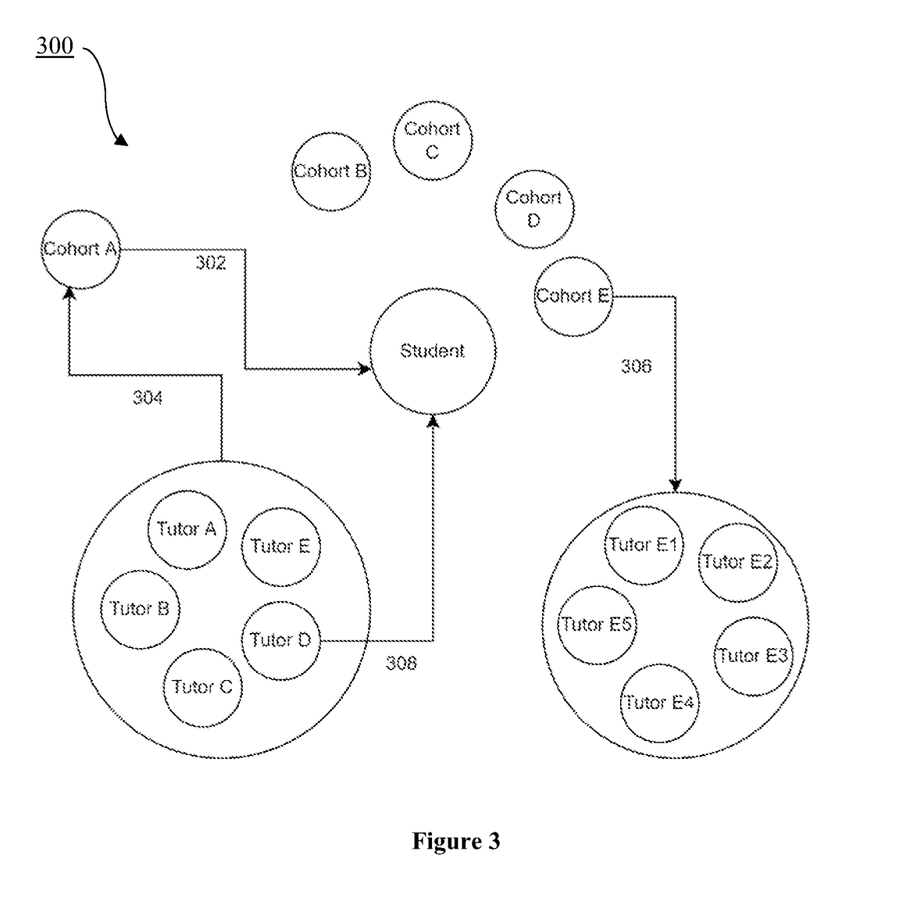
FIG. 3 illustrates an example for connecting the tutor with the student.

FIG. 3 illustrates an example 300 of connecting a tutor with a student. Initially, the system may receive a question from the student. Further, the question may be synthesized into one or more parameters. It may be noted that the student may belong in the set of the cohort of the students. The set of the cohort of the students comprises "Cohort A, Cohort B, Cohort C, Cohort D, and Cohort E". Subsequently, cohort A of the students from the set of the cohort of the students may be determined (302) based on the one or more parameters related to the question. It may be noted that one or more tutors may be assigned to each cohort of the students. In the example, let us assume that Tutor A, Tutor B, Tutor C, Tutor D, and Tutor E may be assigned (304) to the cohort A of the students. Further, Tutor E1, Tutor E2, Tutor E3, Tutor E4, and Tutor E5 may be assigned (306) to the cohort E of the students. After determining the cohort A of the students, the system may identify the tutor D from the one or more tutors based on a relevancy score between a student profile and a tutor profile (tutor D's profile). Subsequently, the system may notify the tutor D in real time. Further, the system may receive an acknowledgement from the tutor D. When the system receives a positive acknowledgement from the tutor D, the system connects (308) the tutor D and the student.

Figure 4:
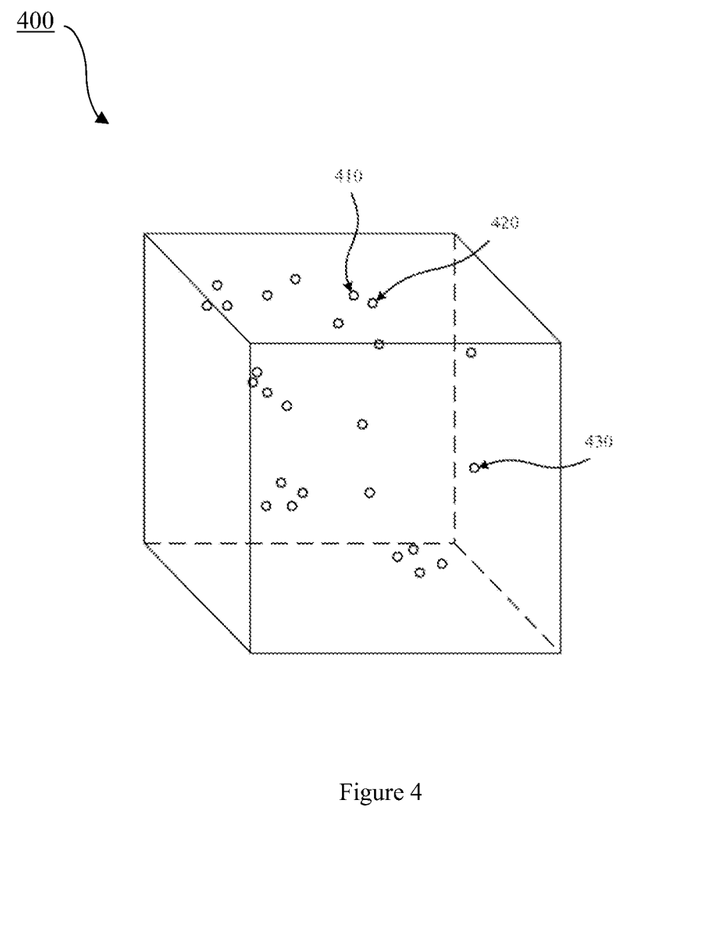
FIG. 4 illustrates an example view of an embedding space.

FIG. 4 illustrates an example view of a vector space 400. In particular embodiments, an object or an n-gram may be represented in a d-dimensional vector space, where d denotes any suitable number of dimensions. Although the vector space 400 is illustrated as a three-dimensional space, this is for illustrative purposes only, as the vector space 400 may be of any suitable dimension. In particular embodiments, an n-gram may be represented in the vector space 400 as a vector referred to as a term embedding. Each vector may comprise coordinates corresponding to a particular point in the vector space 400 (i.e., the terminal point of the vector). As an example and not by way of limitation, vectors 410, 420, and 430 may be represented as points in the vector space 400, as illustrated in FIG. 4.

As another example and not by way of limitation, a dictionary trained to map text to a vector representation may be utilized, or such a dictionary may be itself generated via training. As another example and not by way of limitation, a model, such as Word2vec, may be used to map an n-gram to a vector representation in the vector space 400. In particular embodiments, an n-gram may be mapped to a vector representation in the vector space 400 by using a machine leaning model (e.g., a neural network). The machine learning model may have been trained using a sequence of training data (e.g., a corpus of objects each comprising n-grams).

In particular embodiments, an object may be represented in the vector space 400 as a vector referred to as a feature vector or an object embedding. In particular embodiments, an object may be mapped to a vector based on one or more properties, attributes, or features of the object, relationships of the object with other objects, or any other suitable information associated with the object. As an example and not by way of limitation, an object comprising a video or an image may be mapped to a vector by using an algorithm to connect the student and the tutor in real time. Features used to calculate the vector may be based on information obtained from edge detection, corner detection, blob detection, ridge detection, scale-invariant feature transformation, edge direction, changing intensity, autocorrelation, motion detection, optical flow, thresholding, blob extraction, template matching, Hough transformation (e.g., lines, circles, ellipses, arbitrary shapes), or any other suitable information. As another example and not by way of limitation, an object comprising audio data may be mapped to a vector based on features such as a spectral slope, a tonality coefficient, an audio spectrum centroid, an audio spectrum envelope, a Mel-frequency cepstrum, or any other suitable information. Although this disclosure describes representing an n-gram or an object in a vector space in a particular manner, this disclosure contemplates representing an n-gram or an object in a vector space in any suitable manner.

In particular embodiments, the system 102 may calculate a similarity metric of vectors in vector space 400. A similarity metric may be a cosine similarity, a Minkowski distance, a Mahalanobis distance, a Jaccard similarity coefficient, or any suitable similarity metric. The similarity metric of two vectors may represent how similar the two objects or n-grams corresponding to the two vectors, respectively, are to one another, as measured by the distance between the two vectors in the vector space 400. As an example and not by way of limitation, vector 410 and vector 420 may correspond to objects that are more similar to one another than the objects corresponding to vector 410 and vector 430, based on the distance between the respective vectors. Although this disclosure describes calculating a similarity metric between vectors in a particular manner, this disclosure contemplates calculating a similarity metric between vectors in any suitable manner.

Figure 5:
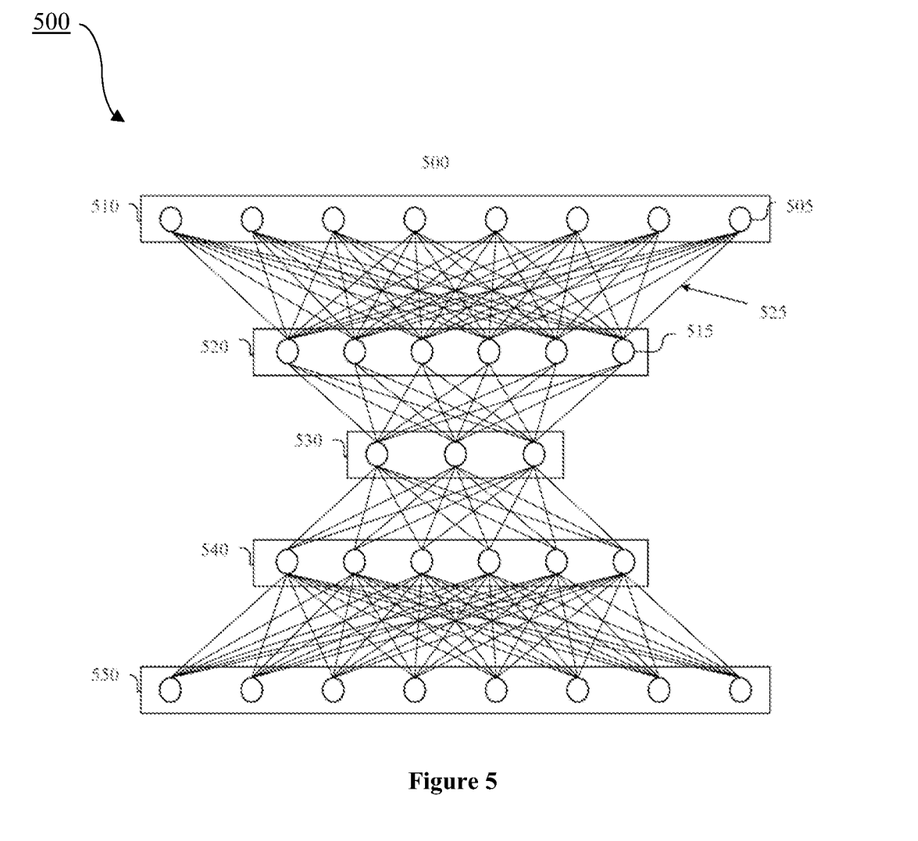
FIG. 5 illustrates an example artificial neural network.

FIG. 5 illustrates an example artificial neural network ("ANN") 500 of the deep learning algorithms. In particular embodiments, an ANN may refer to a computational model comprising one or more nodes. Example ANN 500 may comprise an input layer 510, hidden layers 520, 530, 540, and an output layer 550. Each layer of the ANN 500 may comprise one or more nodes, such as a node 505 or a node 515. In particular embodiments, each node of an ANN may be connected to another node of the ANN. As an example and not by way of limitation, each node of the input layer 510 may be connected to one or more nodes of the hidden layer 520. In particular embodiments, one or more nodes may be a bias node (e.g., a node in a layer that is not connected to and does not receive input from any node in a previous layer). In particular embodiments, each node in each layer may be connected to one or more nodes of a previous or subsequent layer. Although FIG. 5 depicts a particular ANN with a particular number of layers, a particular number of nodes, and particular connections between nodes, this disclosure contemplates any suitable ANN with any suitable number of layers, any suitable number of nodes, and any suitable connections between nodes. As an example and not by way of limitation, although FIG. 5 depicts a connection between each node of the input layer 510 and each node of the hidden layer 520, one or more nodes of the input layer 510 may not be connected to one or more nodes of the hidden layer 520.

In particular embodiments, an ANN may be a feedforward ANN (e.g., an ANN with no cycles or loops where communication between nodes flows in one direction beginning with the input layer and proceeding to successive layers). As an example and not by way of limitation, the input to each node of the hidden layer 520 may comprise the output of one or more nodes of the input layer 510. As another example and not by way of limitation, the input to each node of the output layer 550 may comprise the output of one or more nodes of the hidden layer 540. In particular embodiments, an ANN may be a deep neural network (e.g., a neural network comprising at least two hidden layers). In particular embodiments, an ANN may be a deep residual network. A deep residual network may be a feedforward ANN comprising hidden layers organized into residual blocks. The input into each residual block after the first residual block may be a function of the output of the previous residual block and the input of the previous residual block. As an example and not by way of limitation, the input into residual block N may be F(x)+x, where F(x) may be the output of residual block N-1, x may be the input into residual block N-1. Although this disclosure describes a particular ANN, this disclosure contemplates any suitable ANN.

In particular embodiments, an activation function may correspond to each node of an ANN. An activation function of a node may define the output of a node for a given input. In particular embodiments, an input to a node may comprise a set of inputs. As an example and not by way of limitation, an activation function may be an identity function, a binary step function, a logistic function, or any other suitable function.

In particular embodiments, the input of an activation function corresponding to a node may be weighted. Each node may generate output using a corresponding activation function based on weighted inputs. In particular embodiments, each connection between nodes may be associated with a weight. As an example and not by way of limitation, a connection 525 between the node 505 and the node 515 may have a weighting coefficient of 0.4, which may indicate that 0.4 multiplied by the output of the node 505 is used as an input to the node 515. In particular embodiments, the input to nodes of the input layer may be based on a vector representing an object. Although this disclosure describes particular inputs to and outputs of nodes, this disclosure contemplates any suitable inputs to and outputs of nodes. Moreover, although this disclosure may describe particular connections and weights between nodes, this disclosure contemplates any suitable connections and weights between nodes.

In particular embodiments, the ANN may be trained using training data. As an example and not by way of limitation, training data may comprise inputs to the ANN 500 and an expected output. As another example and not by way of limitation, training data may comprise vectors each representing a training object and an expected label for each training object. In particular embodiments, training the ANN may comprise modifying the weights associated with the connections between nodes of the ANN by optimizing an objective function. As an example and not by way of limitation, a training method may be used (e.g., the conjugate gradient method, the gradient descent method, the stochastic gradient descent) to backpropagate the sum-of-squares error measured as a distances between each vector representing a training object (e.g., using a cost function that minimizes the sum-of-squares error). In particular embodiments, the ANN may be trained using a dropout technique. As an example and not by way of limitation, one or more nodes may be temporarily omitted (e.g., receive no input and generate no output) while training. For each training object, one or more nodes of the ANN may have some probability of being omitted. The nodes that are omitted for a particular training object may be different than the nodes omitted for other training objects (e.g., the nodes may be temporarily omitted on an object-by-object basis). Although this disclosure describes training the ANN in a particular manner, this disclosure contemplates training the ANN in any suitable manner.

Exemplary embodiments discussed above may provide certain advantages. Though not required to practice aspects of the disclosure, these advantages may include those provided by the following features.

Some embodiments of the system and the method predict to find the cohort of the students for whom an individual is a good tutor.

Some embodiments of the system and the method enable the students to rate a tutor.

Some embodiments of the system and the method helps to match the tutor with the student efficiently.

Some embodiments of the system and the method enable connecting the tutor and the student in less than a minute.

Some embodiments of the system and the method enable continuous learning of the model in order to better predict a cohort of the students for the tutor.

Some embodiments of the system and the method enable updating the relevancy score between a student profile and a tutor profile based upon feedback from the student and the tutor.

Some embodiments of the system and the method may help the student to mark the tutor as a favourite tutor.

Some embodiments of the system and the method enable connecting the tutor with the student using Artificial Intelligence Techniques and Deep Learning Algorithms.

Some embodiments of the system and the method may help the tutor to answer a question of choice.

Some embodiments of the system and the method may help the tutor to earn money by answering the question.

Some embodiments of the system and the method enable synthesizing the question in one or more parameters.

Some embodiments of the system and the method enable identifying the one or more tutors across the globe to answer the question in real time.

Although implementations for methods and system for connecting a tutor with a student in real time have been described in language specific to structural features and/or methods, it is to be understood that the appended claims are not necessarily limited to the specific features or methods described. Rather, the specific features and methods are disclosed as examples of implementations for connecting a tutor with a student in real time.

The invention claimed is:

1. A method for connecting a tutor with a student in real time, the method comprises:
   receiving, by a processor (108), a student profile comprising demographic information, a set of cohorts of students, academic details, a performance score, a preferred language of learning, a preferred mode of communication, a feedback from previous tutors, a favorite tutor, aspirations of the student, an available time slot, and a study pattern, and wherein a cohort of the students indicates a plurality of students with similar profiles;
   receiving, by the processor (108), a question from the student, wherein the question is received in at least an image form, a text form, and a voice form;
   synthesizing, by the processor (108), the question into one or more parameters comprising a subject, a topic, a sub-topic, a category, a language of the question, and a difficulty level, and wherein the question is synthesized based on a set of machine learning model;
   determining, by the processor (108), the cohort of students from the set of cohorts of students based on the one or more parameters related to the question;
   dynamically identifying, by the processor (108), a tutor from one or more tutors assigned to the cohort of the students based on a relevancy score between a student profile and one or more tutor profiles, and wherein the tutor is identified when the relevancy score is greater than a predefined threshold, and wherein the relevancy score of the identified tutor is highest amongst the other tutors, and wherein the relevancy score is computed using Artificial Intelligence Techniques and Deep Learning Algorithms, and wherein the tutor is identified for answering the question;
   notifying, by the processor (148), the tutor in real time, based on the relevancy score;
   receiving, by the processor (108), an acknowledgment from the tutor within a predefined time, wherein the acknowledgment is one of a positive acknowledgment or a negative acknowledgment;
   connecting, by the processor (108), the tutor with the student in real time when the acknowledgment is the positive acknowledgment;
   receiving, by the processor (108), a feedbaCk from the student and the tutor; and
   continuously training, by the processor (108), the Deep Learning Algorithms in order to update the relevancy score based on the feedback received from the student and the tutor, and thereby connecting the tutor and the student in real time.

2. The method as claimed in claim 1, wherein the tutor profile comprises a tutor rating, the topic, the sub-topic, the preferred language, a preferred mode of the answer, a preferred category of the answer, and a type of questions answered.

3. The method as claimed in claim 1, wherein the synthesizing the question into the category comprises synthesizing the question into numerical, conceptual, and analytical category.

4. The method as claimed in claim 1 is configured to allot the question to another tutor when at least the acknowledgment is the negative acknowledgment and the predefined time limit is exhausted.

5. The method as claimed in claim 1, wherein an image recognition technique is used to convert the question in the image form to the text form.

6. The method as claimed in claim 1, wherein the synthesizing the question into the difficulty level comprises calculating the difficulty level of a question based on at least a percentage of time the question was unanswered by a tutor, a frequency of the question being asked, and average time taken by tutors to solve the question, and the profile of the cohort of the students.

7. The method as claimed in claim 1, wherein the student profile received from the student is in structured data format.

8. A system (102) for connecting a tutor with a student in real time, the system comprising:
   a memory (112); and
   a processor (108) coupled to the memory (112), wherein the processor (108) is configured to execute program instructions stored in the memory (112) for:
   receiving a student profile comprising, demographic information, a set of cohorts of students, academic details, a performance score, a preferred language of learning, a preferred mode of communication, a feedback from previous tutors, a favorite tutor, aspirations of the student, an available time slot, and a study pattern, and wherein a cohort of the students indicates a plurality of students with similar profiles;
   receiving a question from the student, wherein the question is received in at least an image form, a text form, and a voice form;
   synthesizing the question into one or more parameters comprising a subject, a topic, a sub-topic, a category, a language of the question, and a difficulty level, and wherein the question is synthesized based on a set of machine learning model;
   determining the cohort of students from the set of cohorts of students based on the one or more parameters related to the question;
   dynamically identifying a tutor from one or more tutors assigned to the cohort of the students based on a relevancy score between a student profile and one or more tutor profiles, and wherein the tutor is identified when the relevancy score is greater than a predefined threshold, and wherein the relevancy score of the identified tutor is highest amongst the other tutors, and wherein the relevancy score is computed using Artificial Intelligence Techniques and Deep Learning Algorithms, and wherein the tutor is identified for answering the question;

notifying the tutor in real time, based on the relevancy score;

receiving an acknowledgment from the tutor within a predefined time, wherein the acknowledgment is one of a positive acknowledgment or a negative acknowledgment;

connecting the tutor with the student in real time when the acknowledgment is the positive acknowledgment;

receiving a feedback from the student and the tutor; and continuously training the Deep Learning Algorithms in order to update the relevancy score based on the feedback received from the student and the tutor, and thereby connecting the tutor and the student in real time.

9. A non-transitory computer program product having embodied thereon a computer program for connecting a tutor with a student in real time, the computer program product storing instructions, the instructions comprising instructions for:

receiving a student profile comprising, demographic information, a set of cohorts of students, academic details, a perfOrmance score, a preferred language of learning, a preferred mode of communication, a feedback from previous tutors, a favorite tutor, aspirations of the student, an available time slot, and a study pattern, and wherein a cohort of the students indicates a plurality of students with similar profiles;

receiving a question from the student, wherein the question is received in at least an image form, a text form, and a voice form;

synthesizing the question into one or more parameters comprising a subject, a topic, a sub-topic, a category, a language of the question, and a difficulty level, and wherein the question is synthesized based on a set of machine learning model;

determining the cohort of students from the set of cohorts of students based on the one or more parameters related to the question;

dynamically identifying a tutor from one or more tutors assigned to the cohort of the students based on a relevancy score between a student profile and one or more tutor profiles, and wherein the tutor is identified when the relevancy score is greater than a predefined threshold, and wherein the relevancy score of the identified tutor is highest amongst the other tutors, and wherein the relevancy score is computed using Artificial Intelligence Techniques and Deep Learning Algorithms, and wherein the tutor is identified for answering the question;

notifying the tutor in real time, based on the relevancy score;

receiving an acknowledgment from the tutor within a predefined time, Wherein the acknowledgment is one of a positive acknowledgment or a negative acknowledgment;

connecting the tutor with the student in real time when the acknowledgment is the positive acknowledgment;

receiving a feedback from the student and the tutor; and continuously training the Deep Learning Algorithms in order to update the relevancy score based on the feedback received from the student and the tutor, and thereby connecting the tutor and the student in real time.

* * * * *